Patented July 27, 1937

2,088,327

UNITED STATES PATENT OFFICE 2,088,327

AZO DYESTUFFS AND PROCESS OF PREPARING THEM

Arthur Howard Knight, Blackley, Manchester, England, assignor to Imperial Chemical Industries Limited, a corporation of Great Britain No Drawing. Application July 22, 1935, Serial No. 32,668. In Great Britain July 27, 1934

7 Claims. (Cl. 260—96)

This invention relates to the manufacture of new water-soluble monoazo dyestuffs especially useful for coloring acetate artificial silk.

According to the invention new monoazo dyestuffs are manufactured by coupling a diazotized nitroaniline devoid of sulfo and carboxy groups, with an arylaminoalkanesulfonic acid. In the preferred form of the invention the said arylaminoalkanesulfonic acids have the formula Ar—NR—Alk—SO₃H, where Ar stands for phenyl, tolyl, or the like, devoid of sulfo and carboxyl groups; R stands for hydrogen, alkyl, aralkyl, or alkoxyalkyl; and Alk stands for an alkane group such as ethylene, propylene, or a higher group, which groups may also carry a hydroxy group. Also according to the invention the new dyestuffs are applied to the coloring of acetate artificial silk.

The new dyestuffs are soluble in water and have good affinity for acetate artificial silk, to which material they may be applied by dyeing from a neutral bath containing 1% common salt or by printing. The colorations so obtained have good fastness properties and are readily dischargeable.

It may be noted that, because the new dyestuffs are not decomposed during printing and dyeing operations, i. e. the alkylene radical which carries the sulfonic acid group is not split off, it is possible to obtain deeper shades than are obtainable by using the formally related dyestuffs of U. S. Patents 1,483,798 and 1,483,797 and British Patent 212,029 which do decompose.

The invention is illustrated, but not limited, by the following examples in which the parts are by weight:

Example I

The cooled aqueous solution obtained by diazotizing 138 parts of para-nitroaniline in the usual way is added to a stirred solution of 251 parts of the sodium salt of N-ethylphenyl-taurine and 208 parts of sodium carbonate in 4000 parts of water at 5° C. The sodium salt of the dyestuff separates from solution during coupling and when coupling is complete it is filtered off, washed with a little water or weak brine and dried. It then forms a reddish-brown powder. It is represented by the formula:

A dye bath is prepared by dissolving 0.02 part of the dry dyestuff in 60 parts of lukewarm water. 2 parts of acetate artificial silk are entered into the bath and the temperature raised to 80° C. during a quarter of an hour and kept at that temperature for three-quarters of an hour, 0.2 part of common salt being added as soon as the temperature reaches 80° C., and further additions of 0.2 part being made after a quarter of an hour and after half an hour. The dyed fabric is rinsed with warm water and dried in the usual way. It is dyed an excellent scarlet red shade, of good fastness properties and easily discharged.

Example II

The cooled aqueous solution of 138 parts of para-nitro-aniline, diazotized as before, is added to a stirred solution of 281 parts of the sodium salt of N-ethyl N-beta-hydroxy-gamma-sulfo-propyl-aniline in 4000 parts of water to which have been added 208 parts of sodium carbonate, the temperature being 5° C. When coupling is complete the dyestuff, which is out of solution is filtered off, washed with a little weak brine and dried. It dyes acetate artificial silk in red shades which are rather bluer than the shades obtained as described in Example I. It is represented by the formula:

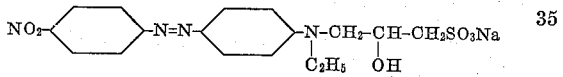

When acetate artificial silk is printed with the above dyestuff in gum tragacanth thickening, scarlet red prints are obtained of good fastness to light and to soap.

Example III 138 parts of para-nitroaniline are diazotized in the usual way and the diazo solution is added gradually to an ice-cold solution of 223 parts of the sodium salt of phenyltaurine

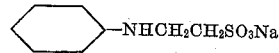

in 4000 parts of water containing 208 parts of sodium carbonate. Coupling is rapid and when complete the coupling mixture is heated to 65° C., and the new dyestuff is isolated by salting out and filtering. The new dyestuff when dry forms a yellow powder which dissolves in warm water to a reddish-yellow solution and in concentrated sulfuric acid to an orange-brown solution. The new dyestuff dyes acetate artificial silk in orange shades when applied from a neutral or alkaline dye bath containing 1% salt, or from an acid dye bath. It is represented by the formula:

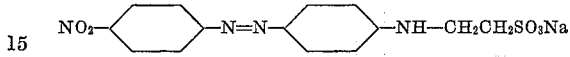

*Example IV*

A suspension of 172.5 parts of 2-chloro-4-nitroaniline in 11000 parts of water and 1100 parts of 10% hydrochloric acid is diazotized by the addition of 69 parts of sodium nitrite. The diazo solution, cooled to 5° C. is added to an ice-cold solution of 223 parts of the sodium salt of phenyltaurine

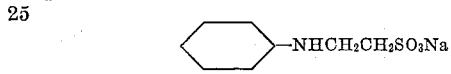

in 4000 parts of water containing 260 parts of sodium carbonate. Coupling is rapid and when complete the coupling mixture is heated to 65° C. and the new dyestuff is isolated by salting out and filtering. The new dyestuff forms a brown powder which dissolves in warm water to a reddish-yellow solution and in concentrated sulfuric acid to an orange-brown solution. The new dyestuff dyes acetate artificial silk in orange shades when applied from a neutral dye bath containing 1% salt. It is represented by the formula:

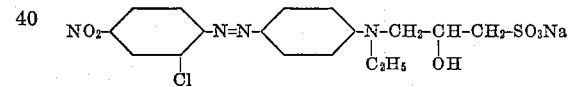

*Example V*

138 parts of para-nitroaniline are diazotized in the usual way and the diazo solution is added to an ice-cold solution of 253 parts of the sodium salt of N-beta-hydroxy-gamma-sulfopropyl-aniline

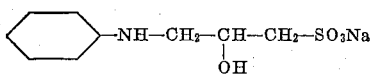

in 4000 parts of water containing 208 parts of sodium carbonate. Coupling is rapid and when complete the coupling mixture is heated to 65° C. and the new dyestuff is isolated by salting out and filtering. The new dyestuff when dried is a brownish-yellow powder and dissolves in water to a yellowish-red solution and in concentrated sulfuric acid to a reddish-brown solution. The new dyestuff dyes acetate artificial silk in reddish-orange shades when applied from a neutral dye bath containing 1% salt. It is represented by the formula:

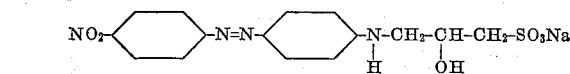

*Example VI*

207 parts of 2,6-dichloro-4-nitroaniline are diazotized by gradual addition to a solution of 69 parts of sodium nitrite in 1480 parts of concentrated sulfuric acid. The sulfuric acid solution is then added to 4000 parts of ice and 1000 parts of water and the solution of the diazo compound so obtained is added gradually to an ice-cold solution of 251 parts of the sodium salt of N-ethyl-phenyltaurine

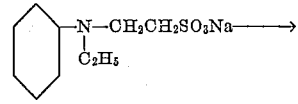

in 4000 parts of water containing 136 parts of sodium acetate. Simultaneously with the addition of the diazo solution there are added 40% aqueous caustic soda at such a rate as to keep the coupling mixture only faintly acid to Congo red paper. The temperature of the coupling mixture is kept throughout the coupling at 0°–5° C. by addition of ice. When all the diazo solution has been added, the mixture is made alkaline to litmus with caustic soda and stirred until the dyestuff separates from solution. It is then filtered off and dried. The new dyestuff forms a brown powder which dissolves in warm water to an orange-brown solution and in concentrated sulfuric acid to a yellowish-brown solution. The new dyestuff dyes acetate artificial silk in orange brown shades of very good light fastness when applied from a neutral dyebath containing 1% salt.

*Example VII*

The solution of sodium salt of N-ethylphenyltaurine used in Example VI is replaced by a solution of 279 parts of the sodium salt of N-ethyl-N-beta-hydroxy-gamma-sulfopropylaniline,

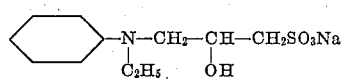

The new dyestuff so obtained is, when dried, a dark brown powder which gives yellowish-brown solutions in water. It dissolves in concentrated sulfuric acid forming orange-brown solutions.

The new dyestuff dyes acetate artificial silk from a neutral bath containing 1% salt in orange-brown shades of very good light fastness.

*Example VIII*

183 parts of 2,4-dinitroaniline are diazotized with sodium nitrite in concentrated sulfuric acid solution in the known way and the aqueous solution of the diazo compound obtained by pouring the concentrated sulfuric acid solution into ice and water is added gradually to an ice-cold solution of 323 parts of the sodium salt of N-n-butyl-N-beta-hydroxy-gamma-sulfopropyl-meta-toluidine

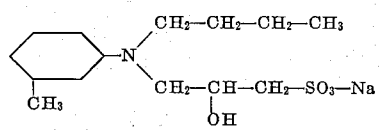

in 4000 parts of water containing 136 parts of sodium acetate. Simultaneously 40% aqueous caustic soda is added at such a rate that the coupling medium is kept neutral or faintly acid to Congo red paper, and ice is added from time to time to keep the temperature at 0°–5° C.

When all the diazo solution has been added the coupling mixture is made alkaline to litmus paper with caustic soda and the dyestuff filtered off and then washed with 5% brine. It is then dried. It forms a dark brown powder which dissolves in water to a violet solution and in concentrated sulfuric acid to a scarlet-red solution. The new dyestuff dyes acetate rayon in violet shades when applied from a neutral dyebath containing 1% salt.

Other examples illustrative of the invention are shown in the following table:— butyl- N -beta-sulfopropyl- 3 -amino- 4 -methoxy toluene

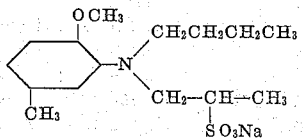

| Example | Diazo compound from— | Coupled with | Shade on acetate artificial silk |
|---|---|---|---|
| 9 | 3-nitro-4-toluidine | N-ethyl-N-beta-hydroxy-gamma-sulfopropylaniline | Orange. |
| 10 | 6-chloro-2,4-dinitroaniline | N-ethyl-N-beta-hydroxy-gamma-sulfopropylaniline | Violet. |
| 11 | 2-chloro-4-nitroaniline | ....do.... | Bluish-crimson. |
| 12 | 3-nitroaniline | N-ethyl-phenyl-taurine | Yellow-orange. |
| 13 | 2-chloro-4-nitroaniline | ....do.... | Crimson-red. |
| 14 | 2,4-dinitroaniline | ....do.... | Reddish-violet. |
| 15 | 4-nitroaniline | N-ethyl-N-(beta-hydroxy-gamma-sulfopropyl)-3-toluidine | Bluish-red. |
| 16 | 2-chloro-4-nitroaniline | ....do.... | Reddish-violet. |
| 17 | ....do.... | N-beta-ethoxy-ethyl-N-phenyltaurine | Crimson-red. |
| 18 | ....do.... | N-beta-hydroxy-gamma-sulfopropylaniline | Reddish-orange. |
| 19 | ....do.... | N-ethyl-N-(beta-sulfoethyl)-3-toluidine | Bordeaux. |
| 20 | 2,6-dichloro-4-nitroaniline | N-(beta-hydroxy-gamma-sulfopropyl)-3-amino-4-methoxy-toluene | Brown. |
| 21 | 6-chloro-2,4-dinitroaniline | N-n-butyl-N-beta-sulfopropyl-3-amino-4-methoxy-toluene | Reddish-blue. |
| 22 | 2,4-dinitro-aniline | N-n-butyl-N-beta-hydroxy-gamma-sulfopropyl-3-amino-4-methoxy-toluene | Reddish-violet. |

An aqueous solution of the sodium salt of N-n-butyl- N -beta-hydroxy-gamma-sulfo-propyl - 3 -amino-4-methoxytoluene

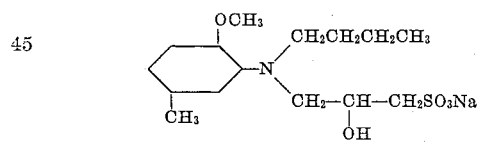

is prepared by refluxing the sodium salt of alpha-chloro-beta - hydroxypropane - gamma - sulfonic acid with 3-amino-4-methoxy-toluene in aqueous medium in the presence of an acid-binding agent (e. g. chalk) to give N-beta'-hydroxy-gamma-sulfo-propyl-3-amino-4-methoxy-toluene, and then refluxing the sodium salt of this compound with n-butyl bromide in aqueous medium in the presence of an acid-binding agent (e. g. chalk). Sufficient sodium carbonate is then added to precipitate the calcium and form the sodium salt of the desired N-n-butyl-N-beta-hydroxy-gamma-sulfo-propyl-3-amino-4-methoxy-toluene.

An aqueous solution of N-n-butyl-N-beta-hydroxy-gamma-sulfo-propyl-3-toluidine

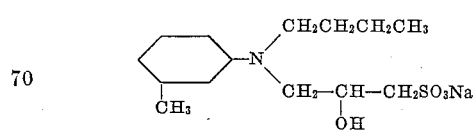

is similarly prepared starting from 3-toluidine.

An aqueous solution of the sodium salt of N-n-butyl-N-beta-sulfopropyl-3-amino-4-methoxytoluene is prepared by reacting N-n-butyl-3-amino-4-methoxytoluene with propylene oxide under pressure at 150–160° C. for several hours to give N-n-butyl-N-beta-hydroxypropyl- 3 -amino- 4 -methoxy-toluene (B. P. 156°–160°/10 mm.), further reacting this compound in toluene solution with sufficient thionyl chloride to give N-n-butyl-N-beta-chloro-propyl- 3 -amino- 4 -methoxytoluene (B. P. 162°–164° C./10 mm.), and finally refluxing this latter product with aqueous sodium sulfite.

The nucleus of the diazotized arylamine, and the nucleus of the arylaminoalkanesulfonic acid may have one or more of the substituents alkyl, alkoxy, halogen, aryloxy, aralkyl, aralkoxy, aryl, hydroaryloxy, and trifluoro-alkyl.

An advantage of this invention is the preparation of dyestuffs having satisfactory properties some of which are similar to the class of dyestuffs which are best described as sulfato-alkyl-azo dyes. Their affinity for cellulose acetate is good and the colors produced thereon are pleasing. Other advantages of the invention are the preparation of new compositions of matter, new azo dyes manufactured therefrom, and technically and economically satisfactory processes of making them.

As many apparently widely different embodiments of this invention may be made without departing from the spirit and scope thereof, it is to be understood that I do not limit myself to the specific embodiments thereof except as defined in the appended claims.

I claim:
1. The process which comprises coupling a diazotized nitroaniline free from water-solubilizing groups to an arylaminoalkanesulfonic acid of the benzene series in which the sulfonic acid group is separated from the nitrogen by a straight chain of at least two carbon atoms.

2. The process which comprises coupling a diazotized nitroaniline free from water-solubilizing groups to an arylaminokanesulfonic acid having the formula Ar—NR—Alk—SO₃H in which Ar is an aryl nucleus of the benzene series free from water-solubilizing substituents having attached to at least one nuclear carbon atom a member from the group consisting of hydrogen, alkyl, alkoxy, halogen, aryloxy, aralkyl, aralkoxy, aryl, hydroaryloxy, and trifluoro-alkyl, R is a member of the group consisting of hydrogen, alkyl, aralkyl, or alkoxyalkyl, and Alk is one of a class consisting of alkane and hydroxyalkane having at least two carbon atoms in the straight alkane-sulfonic acid chain.

3. The compound represented by the formula:

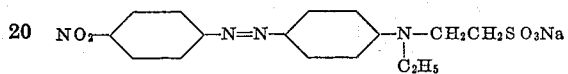

4. The compound represented by the formula:

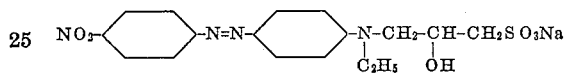

5. The compound represented by the formula:

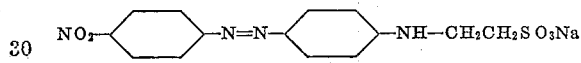

6. A dyestuff having the formula:

having attached to nuclear carbon of each benzene a member from the group consisting of hydrogen, alkyl, alkoxy, halogen, aryloxy, aralkyl, aralkoxy, aryl, hydroaryloxy, and trifluoro-alkyl, and in which R is one of the group consisting of hydrogen, alkyl, aralkyl, or alkoxyalkyl, and Alk is a member from the class consisting of alkane and hydroxyalkane having at least two carbon atoms in the straight alkane-sulfonic acid chain.

7. A dyestuff having the formula:

nitro-benzene-azo-aryl—NR—Alk—SO₃H having attached to nuclear carbon of benzene a member from the group consisting of hydrogen, alkyl, alkoxy, halogen, aryloxy, aralkyl, aralkoxy, aryl, hydroaryloxy, and trifluoro-alkyl, and in which aryl is a nucleus of the benzene series, R is one of the group consisting of hydrogen, alkyl, aralkyl, or alkoxyalkyl, and Alk is a member from the class consisting of alkane and hydroxyalkane having at least two carbon atoms in the straight alkane-sulfonic acid chain.

ARTHUR HOWARD KNIGHT.